(12) United States Patent
Kim et al.

(10) Patent No.: US 8,953,105 B2
(45) Date of Patent: Feb. 10, 2015

(54) 3-DIMENSIONAL DISPLAYING APPARATUS USING LINE LIGHT SOURCE

(75) Inventors: Sung Kyu Kim, Seoul (KR); Ki Hyuk Yoon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 221 days.

(21) Appl. No.: 13/440,023

(22) Filed: Apr. 5, 2012

(65) Prior Publication Data

US 2013/0027909 A1    Jan. 31, 2013

(30) Foreign Application Priority Data

Jul. 25, 2011   (KR) .................. 10-2011-0073576

(51) Int. Cl.
| | |
|---|---|
| *G02F 1/1335* | (2006.01) |
| *F21V 7/04* | (2006.01) |
| *G09G 3/36* | (2006.01) |
| *H04N 13/04* | (2006.01) |
| *G02F 1/1347* | (2006.01) |
| *G02B 27/22* | (2006.01) |

(52) U.S. Cl.
CPC ...... *H04N 13/0454* (2013.01); *G02F 1/133603* (2013.01); *G02F 1/13471* (2013.01); *G02B 27/2214* (2013.01); *H04N 13/0404* (2013.01); *H04N 13/0418* (2013.01); *H04N 13/0475* (2013.01); *G02F 2001/133607* (2013.01); *G02F 2203/62* (2013.01)
USPC ................. 349/15; 349/61; 349/69; 345/102; 345/104; 362/612

(58) Field of Classification Search
CPC ............... H04N 13/0468; G02B 27/22; G02B 27/2214; G02B 27/225; G02F 1/133603
USPC .................. 349/15, 61, 64, 69; 345/102, 104; 362/612
See application file for complete search history.

(56) References Cited

U.S. PATENT DOCUMENTS

| | | | |
|---|---|---|---|
| 5,897,184 A | 4/1999 | Eichenlaub et al. | |
| 2010/0253766 A1* | 10/2010 | Mann et al. ..................... | 348/51 |
| 2011/0051022 A1* | 3/2011 | Kim et al. ......................... | 349/15 |
| 2011/0249220 A1* | 10/2011 | Ouchi et al. ..................... | 349/64 |

FOREIGN PATENT DOCUMENTS

| | | |
|---|---|---|
| KR | 10-2009-0002948 | 1/2009 |
| KR | 10-1001627 | 12/2010 |

* cited by examiner

*Primary Examiner* — Nathanael R Briggs
(74) *Attorney, Agent, or Firm* — NSIP Law (57) ABSTRACT

The present disclosure relates to a 3-dimensional displaying apparatus using line light sources, which includes: a display panel having a plurality of pixels; a backlight panel having a plurality of line light sources disposed to be spaced apart from each other by a predetermined distance, the backlight panel being spaced apart from one surface of the display panel; and a distance-adjusting unit for adjusting a distance between the backlight unit and the display panel. According to the present disclosure, it is possible to display autostereoscopic images which may minimize the quality deterioration of the 3-dimensional images according to the change of distance from an observer to the 3-dimensional displaying apparatus, which is a problem of a displaying apparatus implementing 3-dimensional images by using a general parallax separating unit.

6 Claims, 10 Drawing Sheets

(a) Single Line Light source is used (b) Several Transparent Line light sources are used (c) Volumetric Line light source is used

FIG. 9

(a) Concave Lens type Liquid Crystal Lens is used (b) GRIN type Liquid Crystal Lens is used

FIG. 10

3-DIMENSIONAL DISPLAYING APPARATUS USING LINE LIGHT SOURCE

CROSS-REFERENCE TO RELATED APPLICATION

This application claims priority to Korean Patent Application No. 10-2011-0073576, filed on Jul. 25, 2011, and all the benefits accruing therefrom under 35 U.S.C. §119, the contents of which in its entirety are herein incorporated by reference.

BACKGROUND

1. Field

The present disclosure relates to a 3-dimensional (cubic) displaying apparatus, and more particularly, to a glasses-free (or, autostereoscopic) 3-dimensional displaying apparatus using line light sources, which may minimize the deterioration of quality of a 3-dimensional image caused by the change of distance from the 3-dimensional displaying apparatus by an observer.

2. Description of the Related Art

As the demand for displaying apparatuses capable of 3-dimensional images to give an actual stereoscopic effect not realized by a 2-dimensional image is increasing, displaying apparatuses capable of expressing 3-dimensional images are being developed.

While staring at an object present in the natural world with right and left eyes, a human may have a stereoscopic feeling since both eyes have different viewing angles. Image information of objects with slightly different viewing angles forms an image on the retina through the right and left eyes, and the information of the formed stereo vision is transferred through the optic nerve to the brain to give a stereoscopic effect.

In detail, a 3-dimensional image is generally formed by means of the stereo vision principle through both eyes. Here, there has been proposed a displaying apparatus which may exhibit a cubic image by using the binocular disparity occurring due to the face that both eyes are spaced apart by about 65 mm. To describe the implementation of 3-dimensional images in more detail, right and left eyes looking the displaying apparatus see different 2-dimensional images. If two images are transferred through the retina to the brain, the brain fuses two images exactly to regenerate the original 3-dimensional image in depth and realistically, and this phenomenon is generally called stereography.

In a conventional glass-free 3-dimensional displaying apparatus, a parallax separating unit is disposed at the front of an existing 2-dimensional displaying apparatus to transmit different parallax images to the left eye and the right eye of an observer so that the observer may receive an actual 3-dimensional image. The parallax separating unit used for giving such a stereoscopic effect may be a parallax barrier plate or a lenticular lens sheet. The example where a parallax barrier plate is used as the parallax separating unit to implement a 3-dimensional image is shown in FIG. 1.

Figure 1:
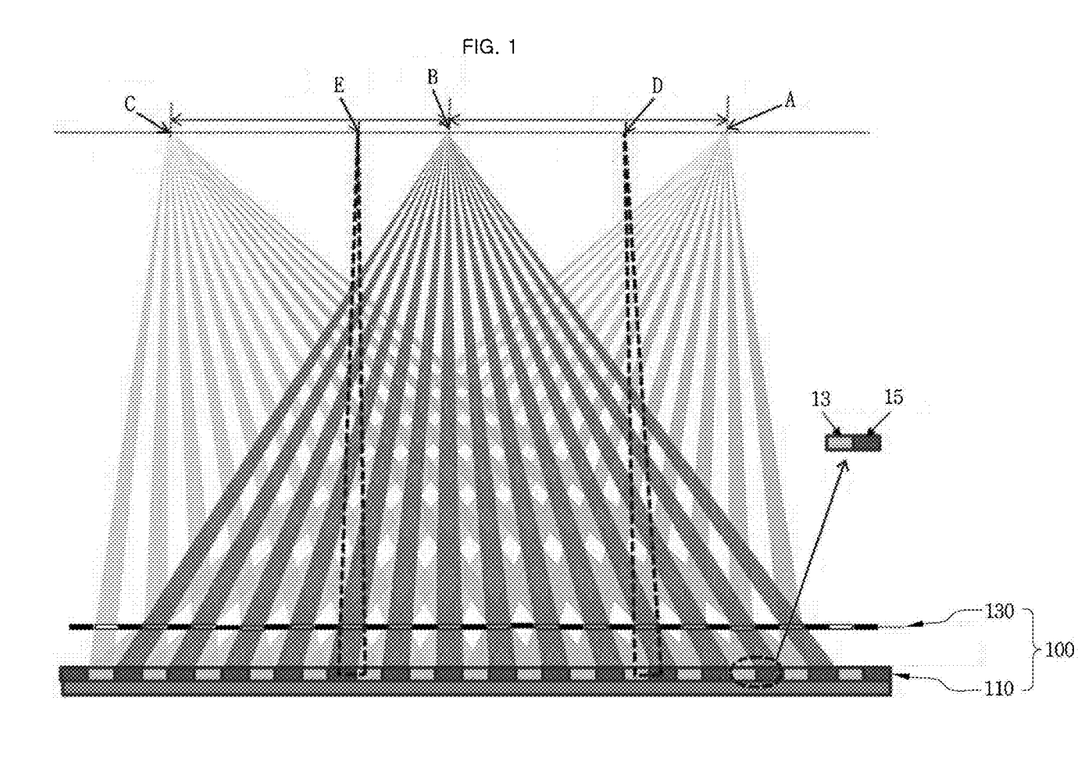
FIG. 1 is a cross-sectional view showing an implementing principle of a conventional 3-dimensional displaying apparatus using a parallax barrier plate.

FIG. 1 shows an implementing principle of a 3-dimensional image information displaying device with two viewing zones as a conventional example. Referring to FIG. 1, the conventional 3-dimensional image information displaying device 100 with two viewing zones includes a general 2-dimensional display panel 110 and a parallax barrier plate 130 disposed to be spaced apart from the front surface of the display panel 110. The pixels formed on the display panel 110 are composed of left eye image pixels 13 and right eye image pixels 15. The parallax barrier plate 130 has an open region and a barrier region, and the image information emitting from the left eye image pixel 13 and the right eye image pixel 15 passes through the open region and does not pass through the barrier region. The image information passing through the open region reaches a designed observation distance to be focused thereat. Among locations of an observer in the designed observation distance, the location A allows only the image information of the left eye to be observed, and the location B allows only the image information of the right eye to be observed.

However, such a method of displaying a 3-dimensional image by means of parallax separation using the parallax barrier plate 130 has several problems which should be solved. First, in a case where the eyes move horizontally so that the left eye is located at the location D and the right eye is located at the location E, the image information emitting from the left eye image pixel 13 and the right eye image pixel 15 are simultaneously applied to the left eye and the right eye as shown by dotted lines in the figure. As a result, it is impossible to see a clear 3-dimensional image. This phenomenon is called that a crosstalk occurs between viewing zones.

Second, in a case where the observer moves horizontally so that the left eye of the observer is located at the location B and the right eye is located at the location C, the left eye watches the image information emitting from the right eye image pixel 15, and the right eye watches the image information emitting from the left eye image pixel 13. As a result, a reversed stereovision is obtained, and it is impossible to watch normal 3-dimensional image information.

Third, the image in the corresponding viewing zone does not have regular brightness, and when the eyes move horizontally, the brightness of the image changes. This problem will be described in detail with reference to FIG. 2.

Figure 2:
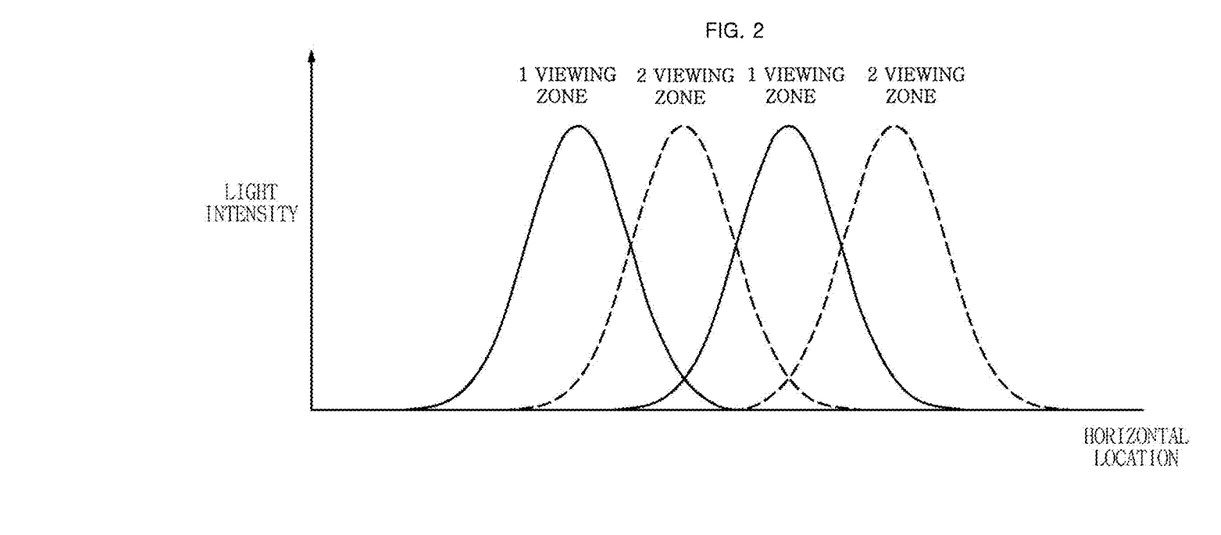
FIG. 2 is a light distribution graph between viewing zones of a 3-dimensional image obtained using the conventional parallax separating unit.

FIG. 2 is a light distribution graph between viewing zones of a 3-dimensional image obtained using a conventional parallax separating unit. Here, the horizontal axis represents a horizontal location at an observation distance, and the vertical axis represents the intensity of light. Referring to FIG. 2, in a case where the left eye and the right eye respectively located at a first viewing zone (shown with a solid line) and a second viewing zone (shown with a dotted line) move right or left in the horizontal direction, the brightness of the corresponding image decreases, and a crosstalk problem also occurs since the information of the image is mixed with the information of a neighboring viewing zone.

In addition, if the observer becomes closer or farther by just 5% of the optimum distance from the display, the viewing zone separation greatly deteriorates, compared with the separation at the optimum distance (see FIGS. 4a to 4d, where the crosstalk increases).

The above description is based on the example where the parallax barrier plate is used as the parallax separation unit, but the same problem as above occurs even when a lenticular lens is used.

A method of displaying a 3-dimensional image using line light sources, without using a parallax separation unit, is also widely known in the art (U.S. Pat. No. 5,897,184). However, this method also has the problems of the 3-dimensional image obtained by the parallax separation unit.

SUMMARY

The present disclosure is directed to providing a 3-dimensional displaying apparatus using line light sources, which may minimize the deterioration of quality of the 3-dimensional image even though an observer changes a distance from the 3-dimensional displaying apparatus in the forward or rearward direction.

In order to solve the quality deterioration of a 3-dimensional image which may occur when an observation distance of an observer from the display changes, line light sources are disposed to be spaced apart from each other at the rear of the display panel, and a backlight composed of line light sources which may operate at different time points is disposed according to the location of the observer, so that the observer may watch the 3-dimensional image without quality deterioration even though the location of the observer changes from the display in the depth direction. At this time, a pupil tracking system may be provided to track the location of the pupil of the observer in real time according to the change of location of the observer, and the locations of the line light sources in the depth direction are changed so that the line light sources may operate at different depths from the display panel, whereby the observer may continuously watch a suitable 3-dimensional image even though the eyes of the observer moves.

In detail, in one aspect, there is provided a 3-dimensional displaying apparatus, which includes: a display panel having a plurality of pixels; a backlight panel having a plurality of line light sources disposed to be spaced apart from each other by a predetermined distance, the backlight panel being spaced apart from one surface of the display panel; and a distance-adjusting unit for adjusting a distance between the backlight unit and the display panel.

The 3-dimensional displaying apparatus may further include a location tracking unit for tracking a location of an observer and feeding back the tracked location to the distance-adjusting unit, and the distance-adjusting unit may adjust the distance based on the tracked location.

The location tracking unit may be a face tracking unit which tracks a location of the face of the observer or a pupil tracking unit which tracks a location of the pupil of the observer.

The line light sources may be formed as light-emitting sources formed by LED, OLED or FED, or line light sources each having an oriented surface light source generating device and an optical element formed at the front surface of the oriented surface light source generating device.

In another aspect, there is provided a 3-dimensional displaying apparatus, which includes: a display panel having a plurality of pixels; and a backlight panel spaced apart from one surface of the display panel, wherein the backlight panel has a plurality of line light source sets disposed to be spaced apart from each other on different planes perpendicular to the display panel, and wherein each of the line light source sets includes a plurality of line light sources disposed to be spaced apart from each other on the same plane.

The backlight panel may be divided into a plurality of backlight panels spaced apart from each other, each of the divided backlight panels having one line light source set.

The 3-dimensional displaying apparatus further may include a location tracking unit for tracking a location of an observer and feeding back the tracked location to the backlight panel, and the backlight panel may selectively operate the line light source sets based on the tracked location.

The location tracking unit may be a face tracking unit which tracks a location of the face of the observer or a pupil tracking unit which tracks a location of the pupil of the observer.

The line light sources may be formed as light-emitting sources formed by LED, OLED or FED, or line light sources each having an oriented surface light source generating device and an optical element formed at the front surface of the oriented surface light source generating device.

In still another aspect, there is provided a 3-dimensional displaying apparatus, which includes: a display panel having a plurality of pixels; and a backlight panel spaced apart from one surface of the display panel, wherein the backlight panel includes an oriented surface light source emitting an oriented light in a direction perpendicular to the display panel; and an optical element formed between the oriented surface light source and the display panel, wherein the light emitting from the surface light source passes through the optical element and forms a line light source set composed of a plurality of line light sources disposed to be spaced apart from each other by a predetermined distance, on a plane perpendicular to the display panel between the optical element and the display panel, and wherein the distance between the line light source set and the display panel is adjusted according to an electric signal applied to the optical element.

The optical element may include a concave lens type substrate having a cylinder shape, a flat plate type substrate, and a liquid crystal layer formed between the concave lens type substrate and the flat plate type substrate, and the electric signal may be applied by an electrode disposed between the concave lens type substrate and the flat plate type substrate.

The optical element may be a liquid crystal lens, the liquid crystal lens may include a liquid crystal layer formed between the substrates, and the electric signal may be applied by an electrode having a predetermined pattern disposed between the substrates.

The 3-dimensional displaying apparatus may further include a lenticular lens between the liquid crystal lens and the display panel.

The 3-dimensional displaying apparatus may further include a location tracking unit for tracking a location of an observer and feeding back the tracked location to an electric signal applying unit, and the electric signal applying unit may adjust the electric signal applied to the optical element based on the tracked location.

The location tracking unit may be a face tracking unit which tracks a location of the face of the observer or a pupil tracking unit which tracks a location of the pupil of the observer.

The 3-dimensional displaying apparatus may further include a focus-adjusting liquid crystal cell formed between the display panel and the backlight panel, and the distance between the line light sources and the display panel may be adjusted according to the electric signal applied to the focus-adjusting liquid crystal cell.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF MAIN ELEMENTS

| | |
|---|---|
| 10: pixel | 13: left eye image pixel |
| 15: right eye image pixel | 30, 50, 60, 70: line light source |
| 110: general 2-dimensional display panel | 130: parallax barrier plate |
| 310: display panel | |
| 330, 510, 520, 530, 610, 620, 630, 710, 720, 730, 810, 860: backlight panel | |
| 650: location tracking unit | |
| 900: line light source device of this disclosure | 910: surface light source |
| 920: polarizing plate | 930: flat plate type substrate |
| 940: liquid crystal layer | 950: concave lens type substrate |
| 960: liquid crystal lens | 961: second substrate |
| 963: liquid crystal layer | 965: first substrate |
| 970: lenticular lens sheet | 1000: focus-adjusting liquid crystal cell |

DETAILED DESCRIPTION

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

Figure 3:
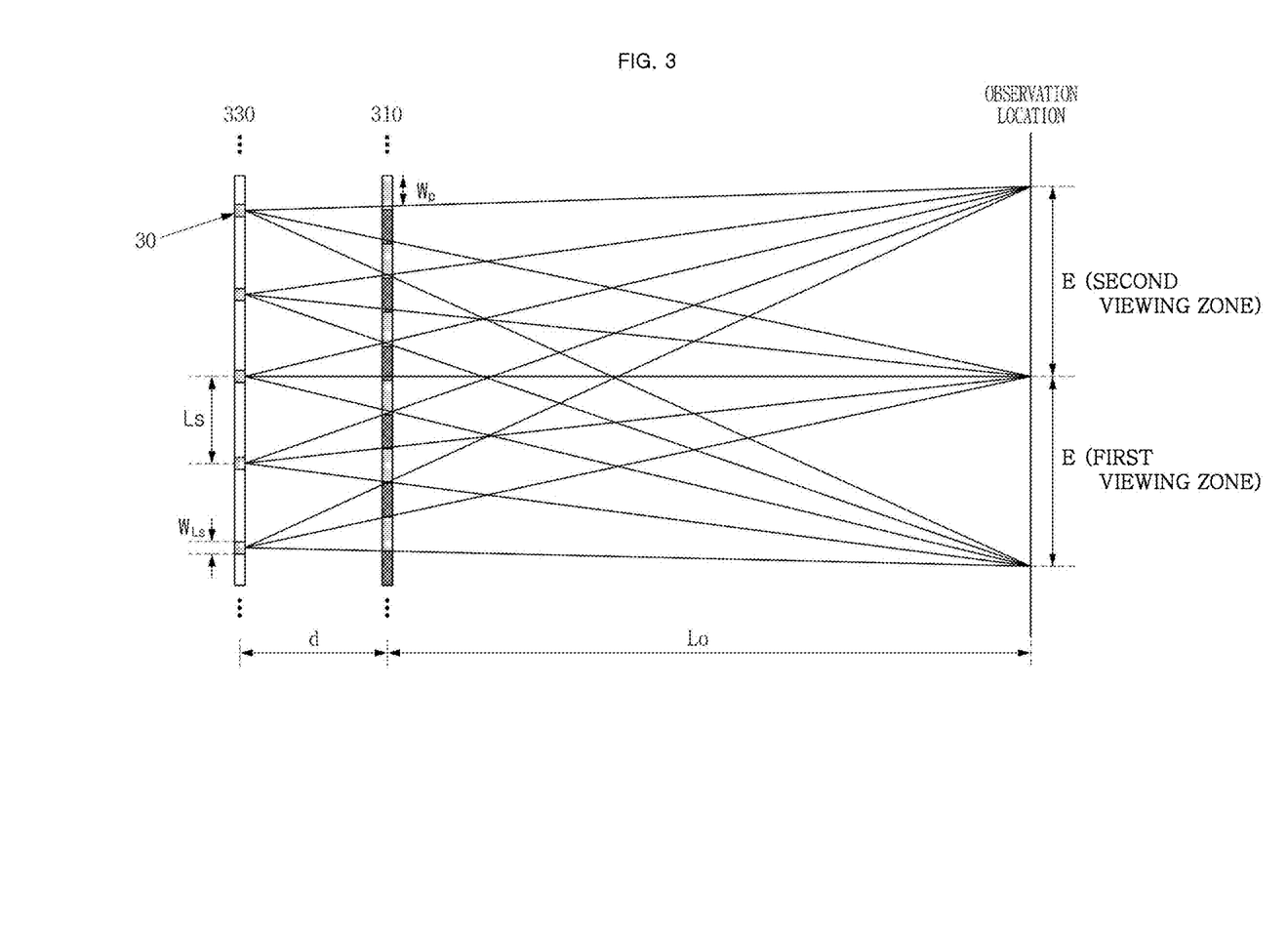
FIG. 3 is a top view showing an autostereoscopic display using line light sources according to an embodiment of the present disclosure.

FIG. 3 is a top view showing an autostereoscopic display using line light sources according to an embodiment of the present disclosure. Referring to FIG. 3, the 3-dimensional displaying apparatus according to the present disclosure includes a display panel 310 displaying information of two or more viewing zones, and a backlight panel 330 having a plurality of line light sources 30 disposed to be spaced apart by a predetermined distance from the rear surface of the display panel 310. The plurality of line light sources 30 of the backlight panel 330 are disposed at regular intervals so that the viewing zones of the image information formed on the display panel 310 are separated at a designed observation distance. FIG. 3 shows the concept where, regarding the two viewing zone image information, the left viewing zone (the first viewing zone) and the right viewing zone (the second viewing zone) are separated at the designed observation location.

The size E of each viewing zone is basically 65 mm which is an average distance between eyes of a human, but the size may be set to be smaller than the average distance between eyes when viewing zones are classified more than two. In order to normally observe the images of two viewing zones at the observation location, the relational expression among a designed observation distance Lo from the display panel 310, a size E of each viewing zone, a distance d between the backlight panel 330 having the line light sources 30 and the display panel 310, a pixel size Wp of the display panel 310, and a distance Ls between neighboring line light sources 30 satisfies the following equation.

$$L_s = 2W_p \frac{L_o + d}{L_o} \quad \text{Equation 1}$$

$$d = \frac{W_p L_o}{E - W_p} \quad \text{Equation 2}$$

Equations 1 and 2 do not consider upper and lower substrates of the display panel 310 or materials coated to the front of the line light sources 30 of the backlight panel 330, and therefore a corrected relational expression should be used when designing an actual viewing zone.

In the viewing zone designed using the relational expression, the distance d between the line light sources 30 and the display panel 310 is determined according to an optimum observation distance Lo of the observer, as shown in Equation 2. If the horizontal location of the observer changes from the optimum distance, a reverse cubic image may occur and the brightness of the viewing zone may become irregular, so various attempts have been made to solve these problems in association with a pupil tracking system. However, the quality deterioration of a 3-dimensional image caused by the change of the optimum observation distance and solutions for this problem has not yet fully discussed.

In the case where a viewing zone is formed when a line light source is used and the line light source moves from the optimum distance in the forward or rearward direction, at an Optimum Viewing Distance OVD formed when a glass-free 3-dimensional viewing zone is initially designed, the viewing zone is formed to be close to a rectangular shape so that the image of each viewing point may be observed with a minimized crosstalk. However, when all 3-dimensional pixels are considered, if any pixel departs from the Optimum Viewing Distance OVD, it is difficult to form a common viewing zone for the 3-dimensional pixels. At this time, the rectangular viewing zone changes into a triangular shape as shown in FIGS. 4a to 4d, and so it is difficult to realize the minimization of crosstalk, which is initially aimed. FIGS. 4a to 4d are graphs showing pixels of the viewing zone according to the simulation condition and resultant distance. The graph of FIGS. 4a to 4d show the change of the viewing zone when an observer moves forwards or rearwards based on the optimum distance from the display panel in the conventional art. The simulation conditions of FIGS. 4a to 4d are as follows.

Figure 4:
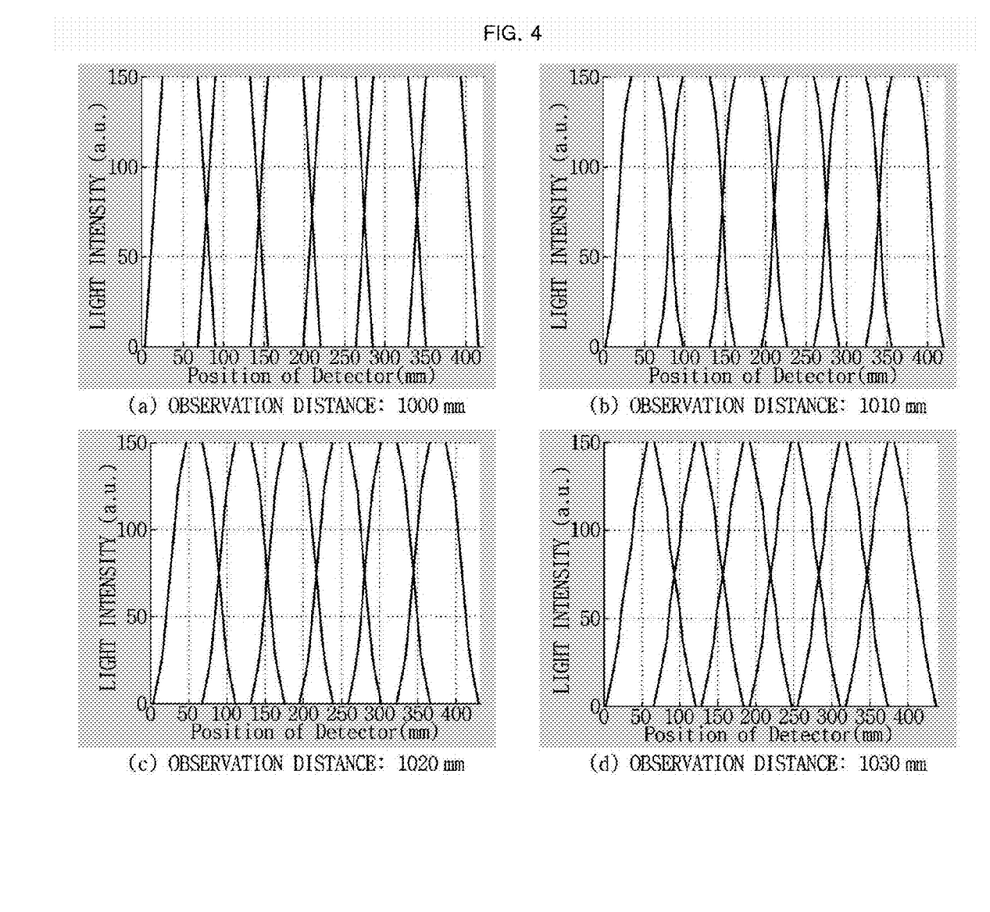
FIGS. 4a to 4d are graphs showing the change of a viewing zone when an observer moves forwards or rearwards based on the optimum distance from an display panel in the conventional art.

Simulation Condition
pixel pitch Wp: 0.45 mm
optimum observation distance Lo: 1000 mm
interval of viewing points E: 65 mm
number of viewing zones: 2
interval between the line light source and the display panel d: 6.9713 mm
interval between line light sources Ls: 0.906 mm
line width $W_{LS}$ of the line light sources: 0.15 mm FIG. 4a is a graph showing the shape of the viewing zone according to a horizontal location at an optimum observation distance 1000 mm. FIGS. 4b to 4d respectively show the shape of the viewing zone at the optimum location which is changing as the distance increases by 1%. For example, the uniform region in one viewing zone decreases as the optimum viewing zone changes less than 3%, and so the crosstalk which is an overlapping phenomenon between neighboring viewing zones increases. Though not shown in the graph, even when the observation distance changes less than 3% from the optimum distance, the result will be similar to those of FIGS. 4b to 4d.

When a 3-dimensional image is obtained at 1000 mm (1 M) observation distance, if the quality of the 3-dimensional image deteriorates just with forward and rearward movement of several ten millimeters, the observer has too small freedom and should watch a long-time 3-dimensional image without forward or rearward movement.

If d is eliminated from Equations 1 and 2, Equation 3 below is obtained.

$$L_s = 2W_p \frac{E}{E - W_p} \qquad \text{Equation 3}$$

As shown in Equation 3, the optimum observation distance Lo and d (distance between the line light sources and the display panel) satisfy the proportionate relationship and offset each other, and Ls (distance between the line light sources) is associated with only the pixel width Wp and the interval E of viewing points so that the optimum observation distance may be adjusted by changing only the distance d between the line light sources and the display panel while maintaining the distance Ls between the line light sources consistently.

Equations 1 to 3 are relational expressions about variables for two viewing zones, and they may be changed to relational expressions about N viewing zones as shown in Equations 4 to 6 below.

$$L_s = NW_p \frac{d + L_0}{L_0} \qquad \text{Equation 4}$$

$$d = \frac{W_p L_0}{E - W_p} \qquad \text{Equation 5}$$

$$L_s = NW_p \frac{E}{E - W_p} \qquad \text{Equation 6}$$

Equations 1 to 3 may be recognized as expressions obtained by substituting N viewing zones of Equations 4 to 6 with two viewing zones. This example will be described as follows with reference to FIG. 5.

Figure 5:
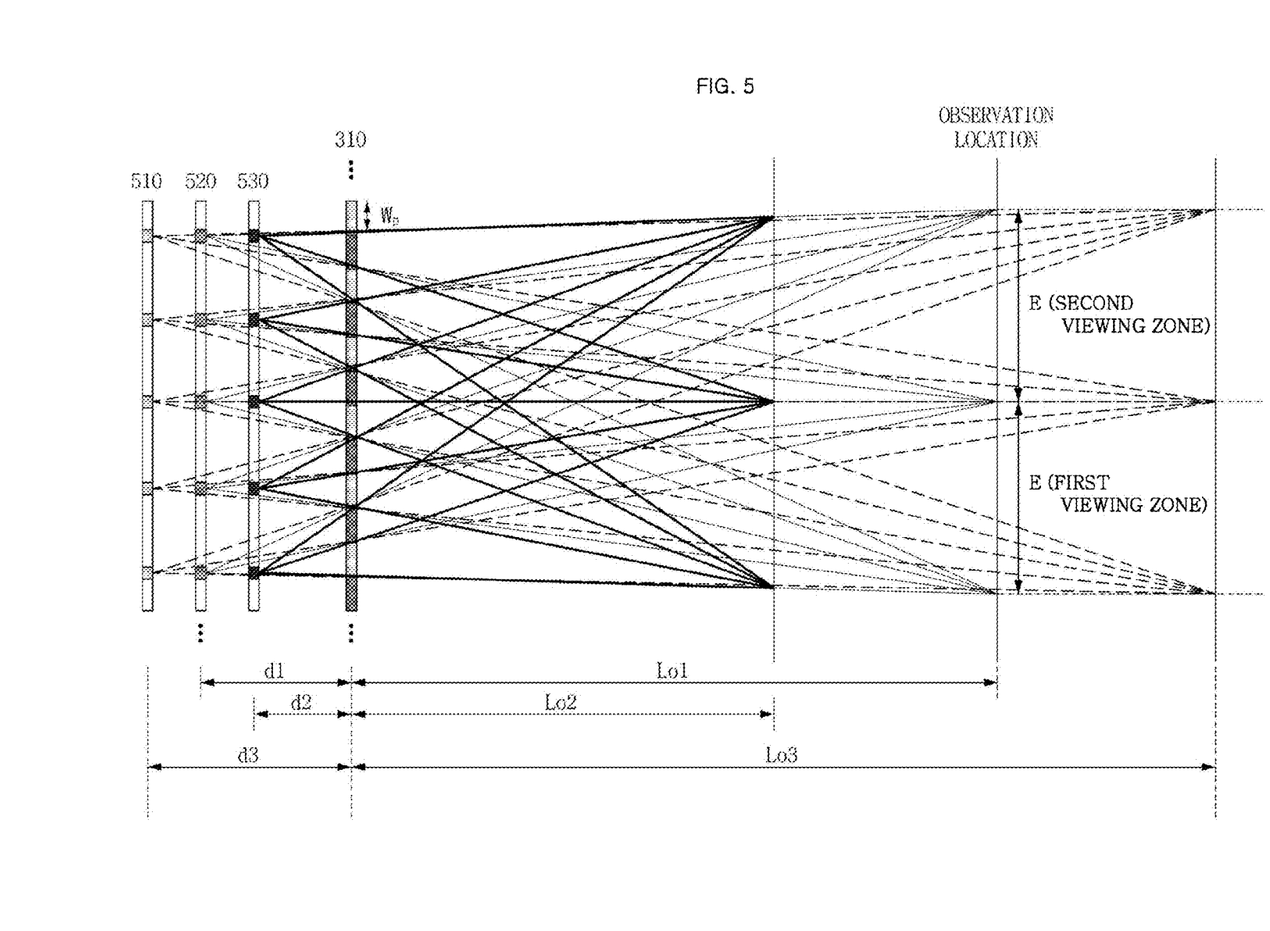
FIG. 5 is a conceptual view showing a two view 3-dimensional displaying apparatus using line light sources with different distances according to an embodiment of the present disclosure.

FIG. 5 is a conceptual view showing a two view 3-dimensional displaying apparatus using line light sources with different distances according to an embodiment of the present disclosure. FIG. 5 shows that backlight panels 510, 520 and 530 having line light source sets at different distances are associated with different optimum distances Lo1 to Lo3 from the display panel 310. The line light source sets at different distances are arranged on each plane so that a distance between neighboring line light sources is identical. The principle of allowing an observer to watch an optimum 3-dimensional image by using the line light source sets at different distances will be described below with reference to the conceptual view of FIG. 6.

Figure 6:
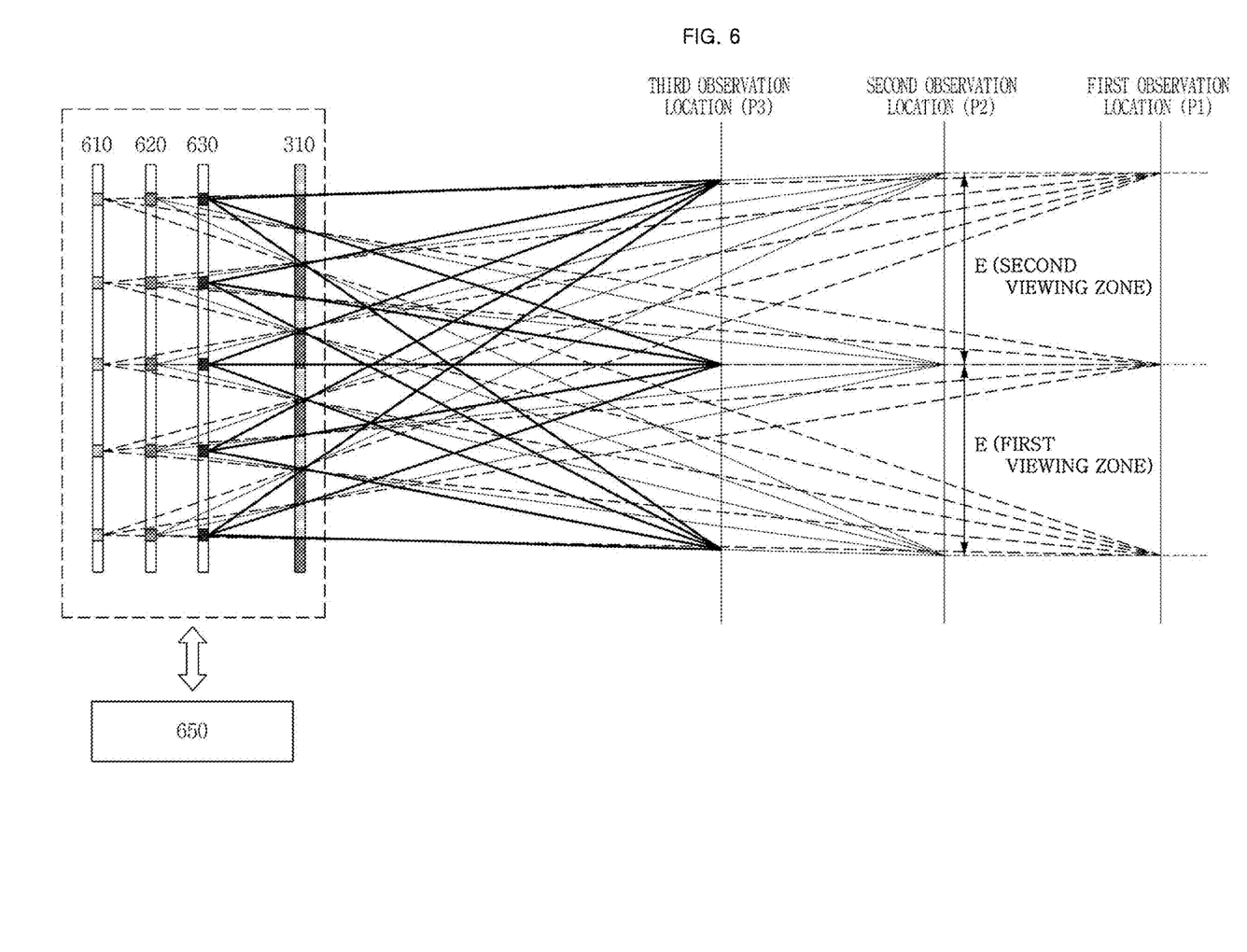
FIG. 6 is a conceptual view for illustrating an operation principle of the two view 3-dimensional displaying apparatus according to an embodiment of the present disclosure.

FIG. 6 is a conceptual view for illustrating an operation principle of the two view 3-dimensional displaying apparatus according to an embodiment of the present disclosure. Referring to FIG. 6, a 3-dimensional display panel (a dotted portion) includes backlight panels 610, 620 and 630 having line light source sets at different distances and a display panel 310 disposed to be spaced apart from the backlight panels 610, 620 and 630 by a predetermined distance. In addition, a location tracking unit 650 tracks the location of the observer and feeds back the location to the 3-dimensional display panel. The location tracking unit may be a pupil tracking unit for tracking the location of the pupil of the observer or a face tracking unit for tracking the face of the observer. In this embodiment, the location tracking unit tracks the location of the pupil. Among the backlight panels 610, 620 and 630, a backlight panel including the line light source set forming a viewing zone in the fed-back pupil observation distance of the pupil is selectively operated. In other case, the backlight panel is effectively moved to form a viewing zone in the pupil observation distance.

In the 3-dimensional displaying apparatus as described above, in the case where the observer is at the location P2 spaced apart from the display panel, only the line light source set of the backlight panel 620 disposed to be spaced apart from the display panel 310 by d1 turns on or effectively moves to the location d1. If there are several line light source sets, line light source sets at the other locations are adjusted to turn off. As a result, if the left and right eyes of the observer are located respectively at the first viewing zone and the second viewing zone in P2 to observe the display panel, the observer may watch an optimum 3-dimensional image.

Meanwhile, if the observer moves closer to the location P3 from the display panel 310, the line light source set of the backlight panel 630 at the location d2 from the display panel 310 turns on, and line light source sets at the location d1 turn off. In other case, when there is only a single line light source, the backlight panel at the location d1 is effectively moved to the location d2 in a physical way or by using a liquid crystal lens. From the above, even at the location P3, the observer may watch a 3-dimensional image having the same quality as in the case of watching at the location P2.

In the case where the observer observes at the location P1 spaced apart from the display panel 310 in the same way, the line light source sets of the backlight panels 620 and 630 at the locations d1 and d2 turn off, and only the line light source set of the backlight panel 610 at the location d3 turns on so that a clear 3-dimensional image may be watched from the display panel 310 even at the location P1. In addition, the above method may be implemented by effective distance change of a single line light source set.

In the case of FIGS. 5 and 6, line light source sets are provided at three locations with different distances so that an observer operates only a line light source set close to the optimum observation distance of each line light source set to optimize the viewing zone characteristics and minimize the crosstalk. As another method, a single line light source set is used, and an observer may effectively change a distance of the line light source by physically moving the line light source set or by optically using a liquid crystal lens or the like so that the line light source set may form an optimum viewing zone according to the observation distance of the observer.

Figure 7:
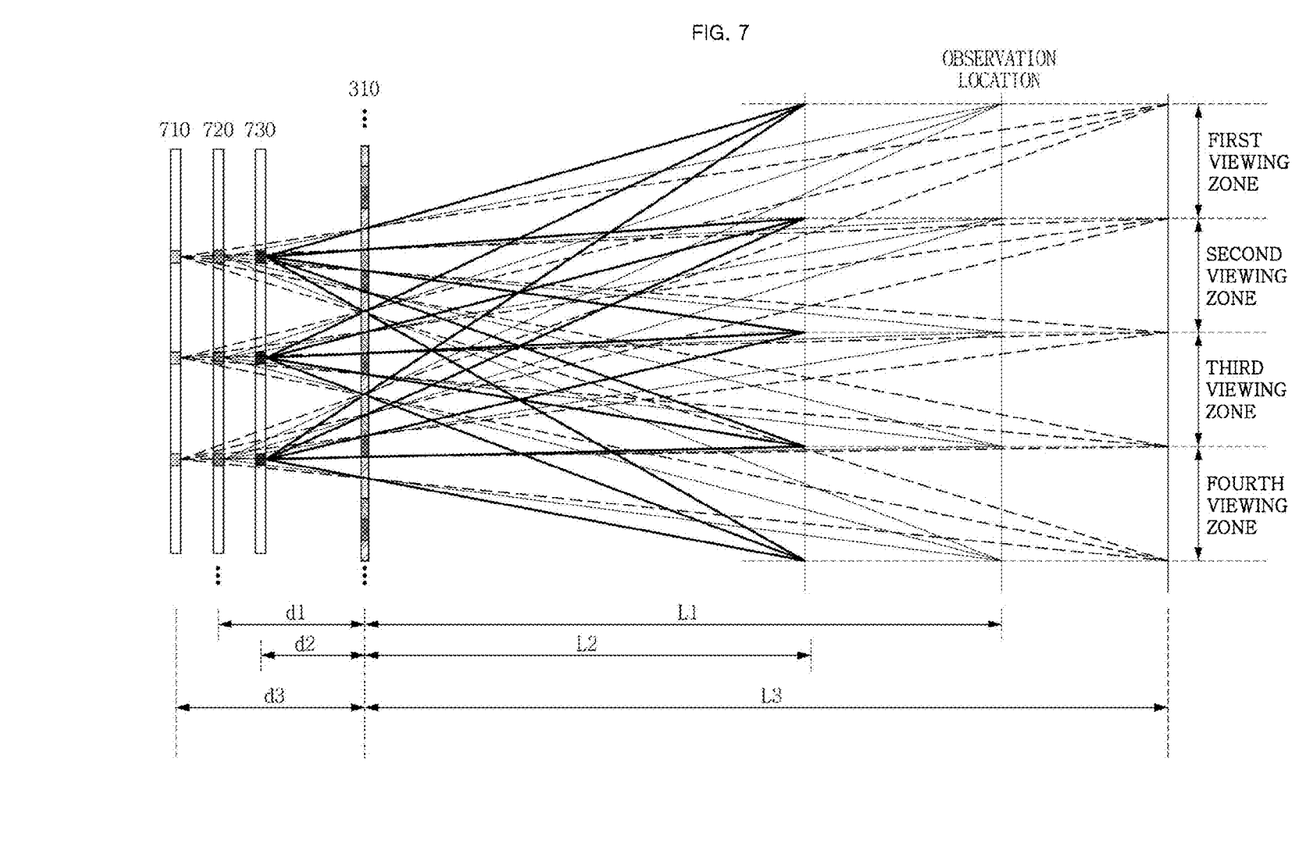
FIG. 7 is a conceptual view showing a four view 3-dimensional displaying apparatus using line light sources with different distances according to an embodiment of the present disclosure.

The above description is based on the two view 3-dimensional image, but it may also be applied to more than two viewing zones. This may be shown using the relational expressions of Equations 4 to 6. For example, FIG. 7 is a conceptual view showing a four view 3-dimensional displaying apparatus using line light sources with different distances according to an embodiment of the present disclosure. Its operation principle is identical to that of FIG. 6.

The line light source sets disposed with different distances as illustrated in FIGS. 5 to 7 may be implemented in various ways. Among them, available embodiments will be described with reference to FIGS. 8 to 10.

FIGS. 8a to 8c show an example where line light sources in a distance direction are actually implemented as a light-emitting line light source set. FIG. 8a is a sectional view showing line light sources formed at a backlight panel 810 spaced apart from the display panel 310 by a predetermined distance. Even though the line light sources used herein are formed on one plane, an interval-adjusting element 820 for the display panel 310 may be provided to feed back the location of an observer through a positioning system of the observer, and an interval between the display panel 310 and the backlight panel 810 having line light sources is adjusted so that an optimum 3-dimensional image may be observed at the corresponding location. In this way, the location of the observer in the distance direction, conceptually illustrated in FIGS. 5 to 7, may be adjusted. The interval-adjusting element 820 for adjusting the interval between the display panel 310 and the line light sources of the backlight panel 810 may be an actuator or PZT which is a piezoelectric element.

FIG. 8b shows another method for implementing a light-emitting light source set. FIG. 8b shows several transparent backlight panels 830, 840 and 850 respectively having a line light source set and piled up, and the display panel 310 spaced apart from the line light source set by a predetermined distance. The distance from the display panel 310 to the observer is checked, and this signal is fed back to operate only a part of the transparent backlight panels 830, 840 and 850 so that the observer may watch an optimum 3-dimensional image even though moving in the distance direction. The transparent backlight panel may be an OLED which uses transparent electrodes.

Figure 8:
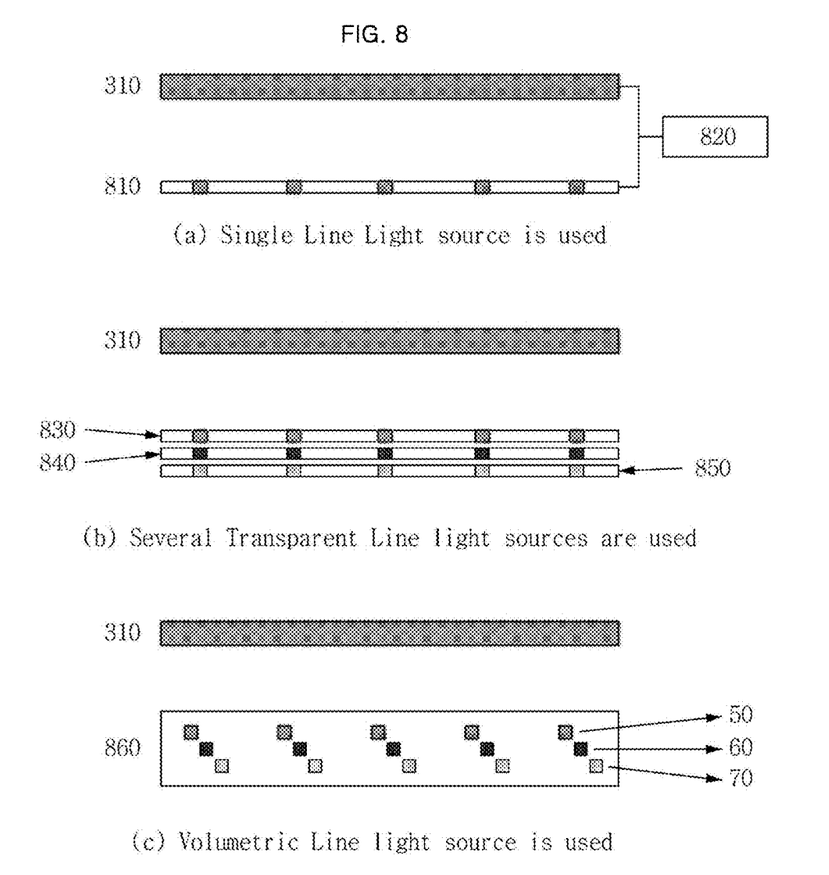
FIGS. 8a to 8c are first conceptual views for illustrating an implementation method of a distance-adjusting line light source according to an embodiment of the present disclosure.

FIG. 8c shows another method for implementing a light-emitting line light source set. In a medium 860 with a consistent thickness, light-emitting sources 50, 60 and 70 are disposed on a plane to be spaced apart from each other by a predetermined distance in the distance direction, and line light sources at locations with different distances are selectively operated according to the location information of the observer so that the observer may watch an optimum 3-dimensional image according to the observer location in the distance direction, which is conceptually illustrated in FIGS. 5 to 7. The line light sources of FIG. 8 may be LED, OLED, FED, or the like which may be implemented in a light emitting type.

Meanwhile, line light sources with different distances from the display panel may also be manufactured using a surface light source with good orientation and an electric optical plate which adjusts a focusing distance according to an electric signal, even though the line light sources are not light-emitting type. FIGS. 9a and 9b show this example.

FIGS. 9a and 9b are second conceptual views for illustrating an implementation method of a distance-adjusting line light source according to an embodiment of the present disclosure. FIG. 9a shows the case where an optical plate including a surface light source 910 with good orientation, a polarizing plate 920 disposed at the front of the surface light source 910, a concave lens type substrate 950 disposed at the front of the polarizing plate 920 and having a cylinder shape, and a liquid crystal layer 940 formed between the concave lens type substrate 950 and a flat plate type substrate 930, is used. In this case, the extraordinary refractive index of the liquid crystal layer 940 is generally greater than the refractive index of the flat plate type substrate 930 and therefore plays a role of a cylindrical convex lens based on the liquid crystal layer 940. Though not shown in the figure, transparent electrodes or metal wires are disposed at the inner sides of both substrates 950 and 930 which are electric optical plates. Therefore, the focusing distance of the light emitting from the backlight may be adjusted by changing the arrangement status of the liquid crystal layer and thereby changing the refractive index in response to an electric field formed by applying a voltage according to an external electric signal determined by the location of the observer. As a result, line light source sets at different locations in the distance direction, which are conceptually illustrated in FIGS. 5 to 7, may be implemented.

FIG. 9b shows the case where a lenticular lens sheet 970 and a liquid crystal lens 960 having a pitch designed according to the interval between the formed line light sources are piled up and disposed at the front surface of a surface light source 910 with good orientation to make line light sources. FIG. 9b is different from FIG. 9a in the point that the focusing distance may be changed more due to the effects of two kinds of lens spaced apart from each other, and so the locations of the line light sources in the distance direction may be changed further in comparison to the embodiment of FIG. 9a. In this case, the liquid crystal lens 960 includes a first substrate 965, a second substrate 961, and a liquid crystal layer 963 formed between the first and second substrates 965 and 961. Electrode structures are formed between both substrates 961 and 965 and the liquid crystal layer 963 so that the location of line light sources in the distance direction which are formed after the lenticular lens sheet 970 may be changed by adjusting the arrangement status of the liquid crystal layer 963 according to the applied voltage. The liquid crystal lens 960 changes the lens effect when an electric field is applied according to the upper and lower electrode structures, and may be a gradient index (GRIN) type liquid crystal lens which changes locations of line light sources in the distance direction. In addition, the liquid crystal lens 960 may be configured by a liquid crystal layer 940 formed between the concave lens type substrate 950 and the flat plate type substrate 930 which have a fixed cylinder shape as shown in FIG. 9a. In this case, the extraordinary refractive index of the liquid crystal layer 930 is generally greater than the refractive index of the flat plate type substrate 930 and therefore plays a role of a cylindrical convex lens based on the liquid crystal layer. At this time, the location in the distance direction where line light sources are formed may be changed by adjusting the arrangement of the liquid crystal layer according to the applied electric field. FIG. 9b shows the case where a lenticular lens sheet 970 is disposed between the display panel 310 and the liquid crystal lens 960, but the liquid crystal lens 960 and the lenticular lens sheet 970 may also be used in a reversed order.

The surface light source 910 with good orientation shown in FIGS. 9a and 9b may be configured to generate light similar to collimated light in order to maximize the efficiency of the electric optical plate adjusting the focusing distance according to the electric signal (or, in order to concentrate light to the line light source) or may be configured with a line light source set identical to the period of the cylinder convex lens.

Figure 9:
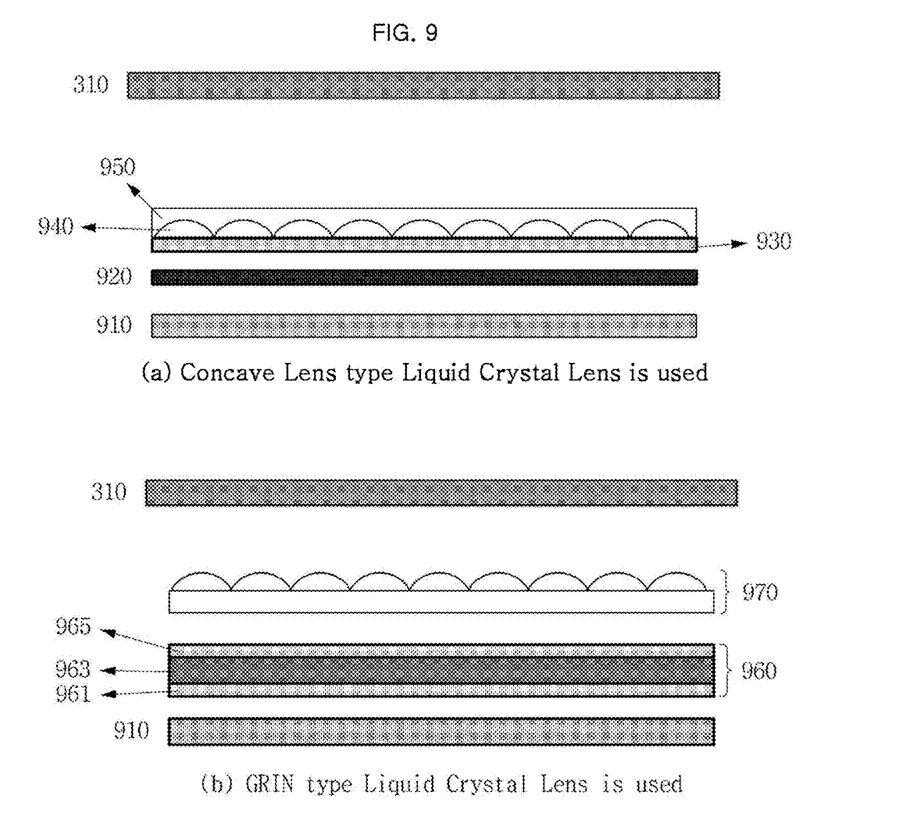
FIGS. 9a and 9b are second conceptual views for illustrating an implementation method of a distance-adjusting line light source according to an embodiment of the present disclosure.

In particular, the embodiments of the line light sources shown in FIGS. 8b, 8c and 9a may have a 2D/3D conversion mode. For example, in order to operate in a 3D mode, in FIGS. 8b and 8c, only line light source sets in different distances are operated, and in FIG. 9a, the locations in the distance direction of line light sources formed after passing through the concave lens type substrate according to a suitable electric signal are changed according to the location of the observer. Meanwhile, in order to operate in a 2D mode, in FIGS. 8b and 8c, line light sources in different distances are operated, and in FIG. 9a, an electric signal is applied so that the concave lens type substrate 950 and the liquid crystal layer 940 having a cylinder shape have the same refractive index, or both media are selected to have the same refractive index without an electric signal. At this time, the lens effect is eliminated, and therefore the mode is converted to a mode in which a general 2D image is watched instead of 3D image. In addition, in all embodiments of FIGS. 8a to 9b, a variable diffusion plate (e.g., PDLC or the like) may be used between the display panel and the line light sources or a variable liquid crystal lens for the conversion between the 2D mode and the 3D mode.

Figure 10:
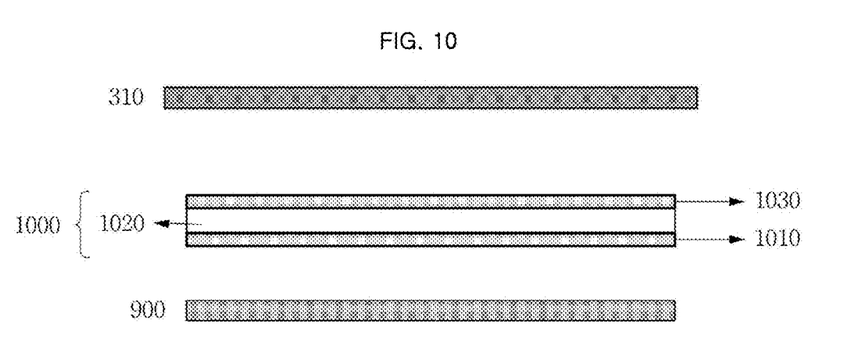
FIG. 10 is a third conceptual view for illustrating an implementation method of a distance-adjusting line light source according to an embodiment of the present disclosure.

FIG. 10 is a third conceptual view for illustrating an implementation method of a distance-adjusting line light source according to an embodiment of the present disclosure. In FIG. 10, the system where the distance between an observer and an operating line light source set or a display panel of line light sources is effectively changed according to the location of the observer as illustrated in FIGS. 8a to 9b is called a line light source device 900 (810 in FIG. 8a, and 910 to 950 in FIG. 9a), and a focus-adjusting liquid crystal cell 1000 configured with a liquid crystal layer 1020 formed between both substrates 1010 and 1030 according to the application of an electric field may be added between the display panel 310 and the line light source device 900. In this case, the actual distance between the line light sources and the liquid crystal display panel implemented in FIGS. 8a to 9b may be changed according to the electric field applied to the focus-adjusting liquid crystal cell 1000, and therefore, as described above, the location information of the observer may be fed back to adjust the voltage applied to the focus-adjusting liquid crystal cell 1000 and thereby adjust the distance between the liquid crystal display panel 310 and the line light source device 900 so that the observer may watch an optimum 3-dimensional image even though changing a location in the distance direction.

According to the present disclosure, it is possible to display glass-free 3-dimensional images which may minimize the quality deterioration of the 3-dimensional images according to the change of distance from an observer to the 3-dimensional displaying apparatus, which is a problem of a displaying apparatus implementing 3-dimensional images by using a general parallax separating unit.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A 3-dimensional displaying apparatus using line light sources, comprising:
    a display panel having a plurality of pixels, the display panel comprising a front side surface and a back side surface opposite to the front side surface; and
    a backlight panel spaced apart from the back side surface of the display panel and disposed to be parallel to the display panel,
    wherein the backlight panel comprises a plurality of line light source sets, each line light source set being disposed at a different distance from the back side surface of the display panel,
    wherein each of the line light source sets comprises a plurality of line light sources disposed at regular intervals,
    wherein the regular intervals between the plurality of line light sources of any two of the line light source sets are the same, and
    wherein the line light source sets are driven asynchronously.

2. The 3-dimensional displaying apparatus using line light sources according to claim 1, wherein the backlight panel comprises a plurality of backlight panels, each of the plurality of backlight panels being disposed at a different distance from the back side surface of the display panel, and
    wherein each of the plurality of backlight panels comprises each of the plurality of line light sources disposed at regular intervals.

3. The 3-dimensional displaying apparatus using line light sources according to claim 1,
    wherein the 3-dimensional displaying apparatus further comprises a location tracking unit for tracking a location of the observer and feeding back the tracked location to the backlight panel, and
    wherein the backlight panel selectively operates the line light source sets based on the tracked location.

4. The 3-dimensional displaying apparatus using line light sources according to claim 3, wherein the location tracking unit is a face tracking unit which tracks a location of the face of the observer or a pupil tracking unit which tracks a location of the pupil of the observer.

5. The 3-dimensional displaying apparatus using line light sources according to claim 1, wherein the line light sources are formed as light-emitting sources formed by LED, OLED or FED, or line light sources each having an oriented surface light source generating device and an optical element formed at the front surface of the oriented surface light source generating device.

6. The 3-dimensional displaying apparatus using line light sources according to claim 1,
wherein the 3-dimensional displaying apparatus further comprises a focus-adjusting liquid crystal cell disposed between the back side surface of the display panel and the backlight panel.

* * * * *